United States Patent [19]

Douillet et al.

[11] Patent Number: 4,751,820
[45] Date of Patent: Jun. 21, 1988

[54] CONTROL DEVICE FOR A TWIN MASTER CYLINDER

[75] Inventors: Christian Douillet, Puteaux; Joël Vasselet, Rosny-sous-Bois, both of France

[73] Assignee: Bendix France, Paris, France

[21] Appl. No.: 851,601

[22] Filed: Apr. 14, 1986

[30] Foreign Application Priority Data

| Apr. 24, 1985 | [FR] | France | 85 06210 |
| Jan. 22, 1986 | [FR] | France | 86 00884 |
| Feb. 26, 1986 | [FR] | France | 86 02649 |

[51] Int. Cl.⁴ .................................... F15B 7/00
[52] U.S. Cl. .................................... 60/581; 74/470; 74/586
[58] Field of Search .......... 60/581; 92/129; 74/470, 74/512, 582

[56] References Cited

U.S. PATENT DOCUMENTS

| 537,346 | 4/1895 | Maag | 74/582 |
| 2,191,987 | 2/1940 | Goepfrich | 188/152 |
| 2,319,368 | 5/1943 | Schnell | 74/110 |
| 2,544,134 | 3/1951 | Clark | 92/84 |
| 2,605,615 | 8/1952 | Meredith | 92/84 |
| 3,142,965 | 8/1964 | Hazelbaker | 60/581 |
| 3,278,240 | 10/1966 | Boyd | 303/6 |
| 3,335,570 | 8/1967 | Fay . | |
| 3,360,938 | 1/1968 | Davis | 60/581 |
| 4,255,931 | 3/1981 | Leiber | 60/581 |
| 4,441,596 | 4/1984 | Nakahara | 74/512 |
| 4,464,899 | 8/1984 | Myers et al. | 60/547.1 |
| 4,490,979 | 1/1985 | Reynolds | 60/581 |

FOREIGN PATENT DOCUMENTS

| 1480011 | 7/1969 | Fed. Rep. of Germany . | |
| 1655266 | 1/1971 | Fed. Rep. of Germany . | |
| 2826471 | 1/1979 | Fed. Rep. of Germany . | |
| 497011 | 6/1951 | Italy | 60/581 |
| 1054824 | 1/1967 | United Kingdom . | |

*Primary Examiner*—Abraham Hershkovitz
*Attorney, Agent, or Firm*—Larry J. Palguta; Ken C. Decker

[57] ABSTRACT

The subject of the invention is a control device (10) for a twin master cylinder of the type with two master cylinders positioned parallell to one another and side by side, the device (10) being capable of being positioned between an actuating pedal and the pistons of the masters cylinder, the device (10) incorporating a control rod (44) which is capable of being connected to the pedal and two pushrods (28, 28') which are each capable of acting upon one of the pistons, the pushrods (28, 28') being guided so as to slide parallel to the axes of the master cylinders. According to the invention, the control rod (44) cooperates with the push rods (28, 28') through levers (52, 54) each of which is hinged at one end (56, 58) to one of the rods (28, 28') and is pushed so as to bear at the other end (64, 66) upon a bearing surface (62, 60) of the other rod (28', 28) by means of a peg (80) which is firmly fixed to the control rod (44). Application to the braking systems of motor vehicles.

10 Claims, 5 Drawing Sheets

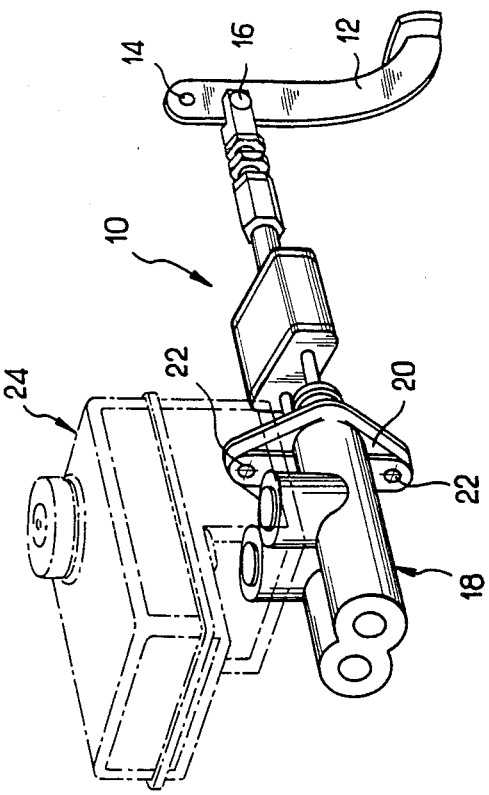
FIG_1
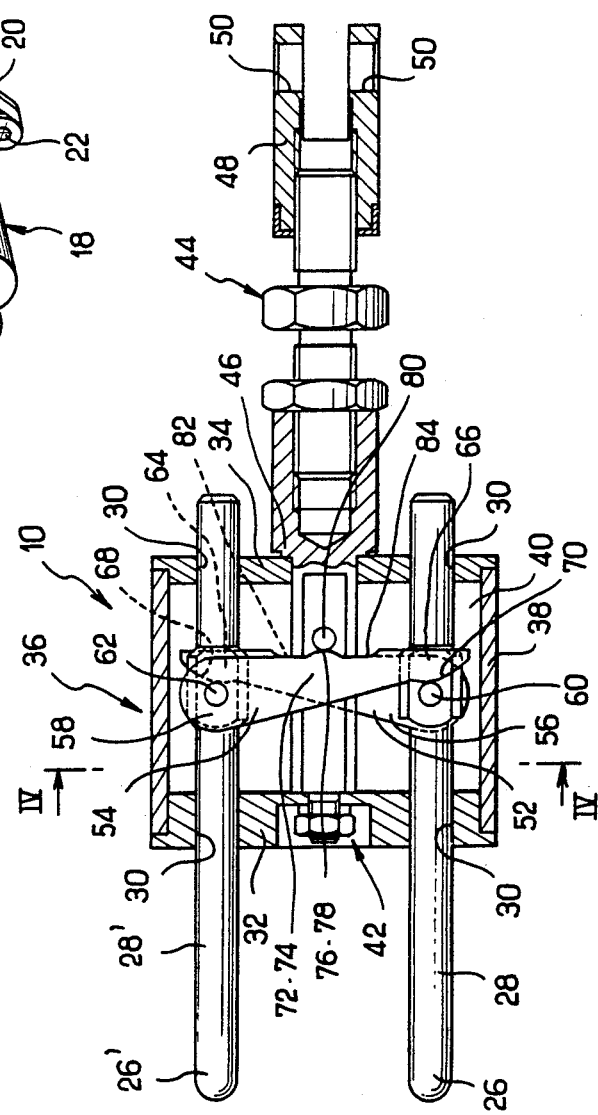
FIG.2

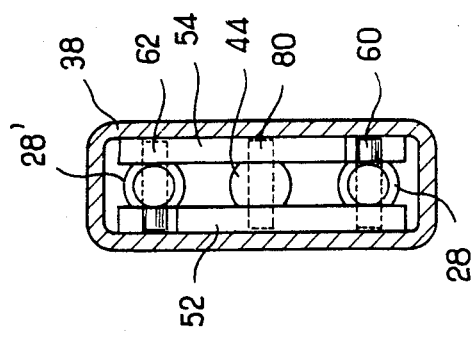
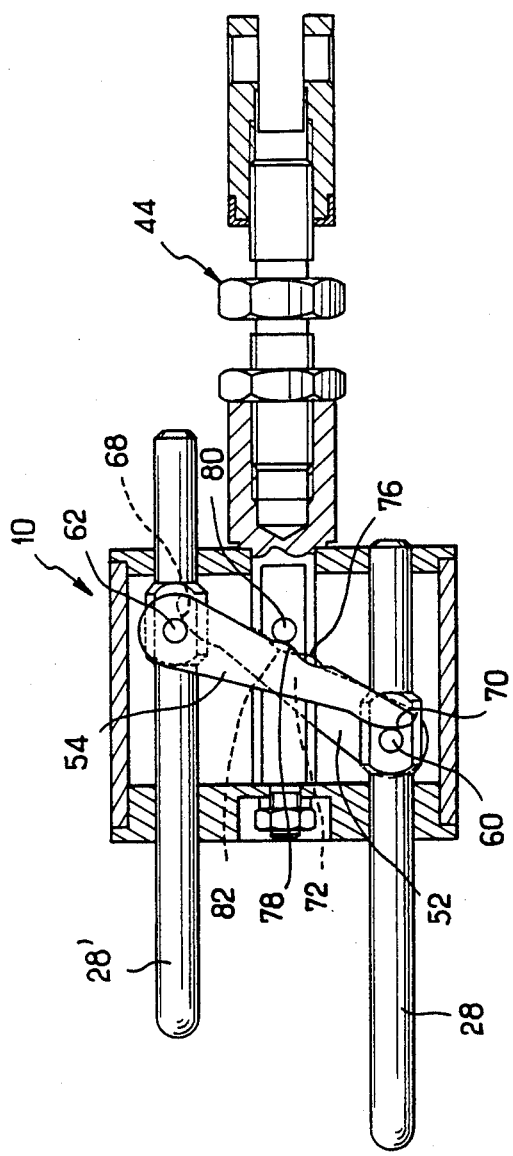
FIG_3
FIG_4

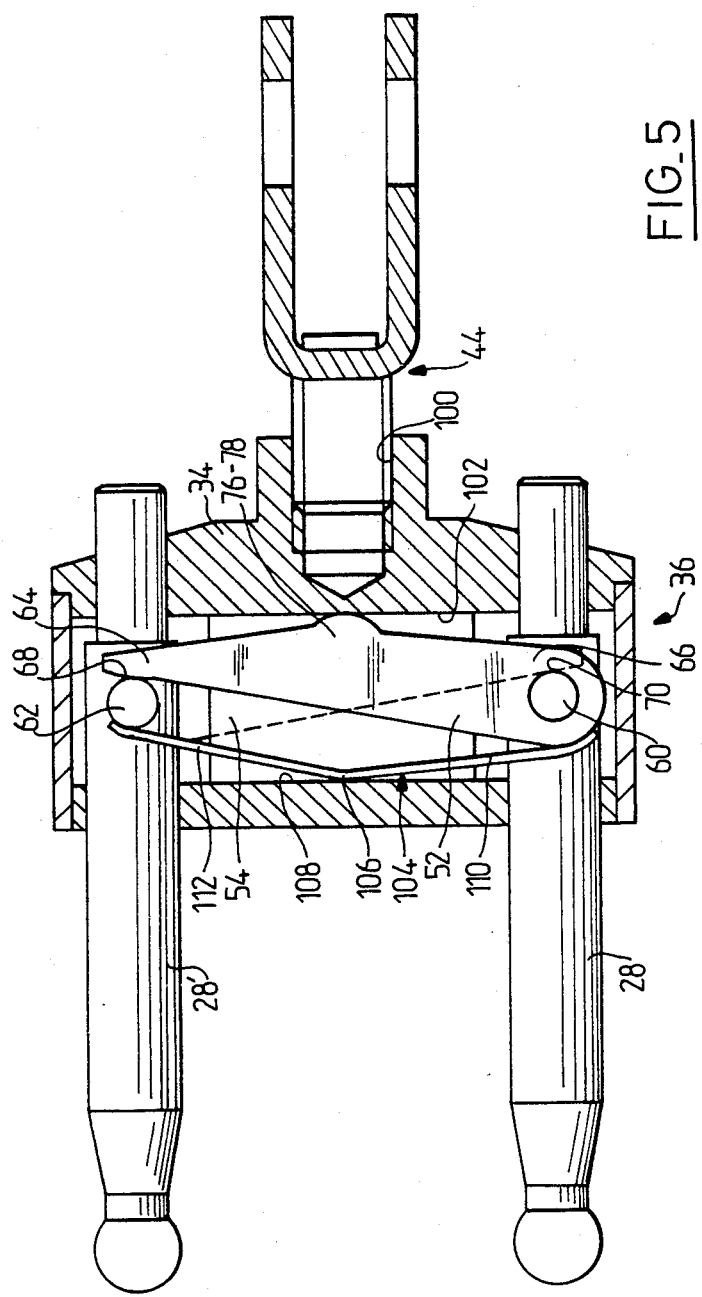
FIG_5

CONTROL DEVICE FOR A TWIN MASTER CYLINDER

The present invention relates to a control device for a twin master cylinder particularly for a motor vehicle.

The invention concerns more particularly such a control device for use with two master cylinders positioned parallel to one another and side by side, this device being capable of being positioned between an actuating pedal and the pistons of the master cylinders.

In this type of installation, the master cylinder is mounted on a fixed portion of the vehicle, for example the fire wall, and the pedal is hinged relative thereto. The control device, which is located between the pedal and the master cylinder, must be able to provide the transmission of force without intermediate guidance and therefore the control device must be rigid. If such a control device were constructed as a single piece incorporating, on the one hand, an attachment to the pedal, and on the other hand, two parallel pushrods capable of actuating the pistons of the master cylinders, it would have the major disadvantage of preventing any operation of the master cylinders if the piston of one master cylinder seized in its bore. To overcome this disadvantage a bar may be incorporated in the control device which necessitates providing axial guidance not only for the pushrods but also for the control rod positioned on the same side as the pedal. However, this multiple guidance is difficult to construct taking into account the large number of tolerances to be accommodated in a region of the vehicle which does not lend itself well to this type of guidance.

The object of the invention is to provide a control device which will operate in all circumstances, which is constructed economically and which does not have the disadvantages mentioned above, and in particular in which the problem of guidance relative to the fire wall is resolved, the rigidity of the control assembly is ensured, and in addition, irrespective of the imbalance which may appear between the pistons of the master cylinders, the device enables the forces to be shared between the two circuits without appreciable loss of force between the input output forces.

According to the invention there is provided a control device for a twin master cylinder of the type comprising two master cylinders positioned parallel to one another and side by side, the device being capable of being positioned between an actuating pedal and the pistons of the master cylinders, the said device comprising a control rod which is capable of being connected to the pedal and two pushrods which are each capable of acting upon one of the pistons, the pushrods being guided so as to slide parallel to the axes of the said master cylinders, characterized in that the control rod cooperates with the pushrods through levers each of which is hinged at one end to a rod and is pushed so as to bear at the other end against a bearing surface of the other rod by means of a peg which is firmly fixed to the control rod.

It will be understood that due to such a construction, the control rod cooperates with the pushrods through two levers which provide an interaction between the two pushrods enabling the force and the travel of the control rod to be shared between these rods irrespective of the travel of one of the pushrods relative to the other.

Other characteristics and advantages of the control device which is the subject of the present invention will emerge from the following description of an embodiment which is given by way of illusration but is not limiting in any way, with reference to the accompanying drawings, in which:

FIG. 1 is a perspective view of a control device according to a first embodiment of the invention, positioned between a twin master cylinder and a brake pedal;

FIG. 2 is a partial enlarged sectional view of the device shown in FIG. 1;

FIG. 3 is a view similar to that shown in FIG. 2 in which the two pushrods are axially offset;

FIG. 4 is a sectional view according to the line IV—IV in FIG. 2.

FIG. 5 is a sectional view of a second embodiment of control device;

Figure 6:
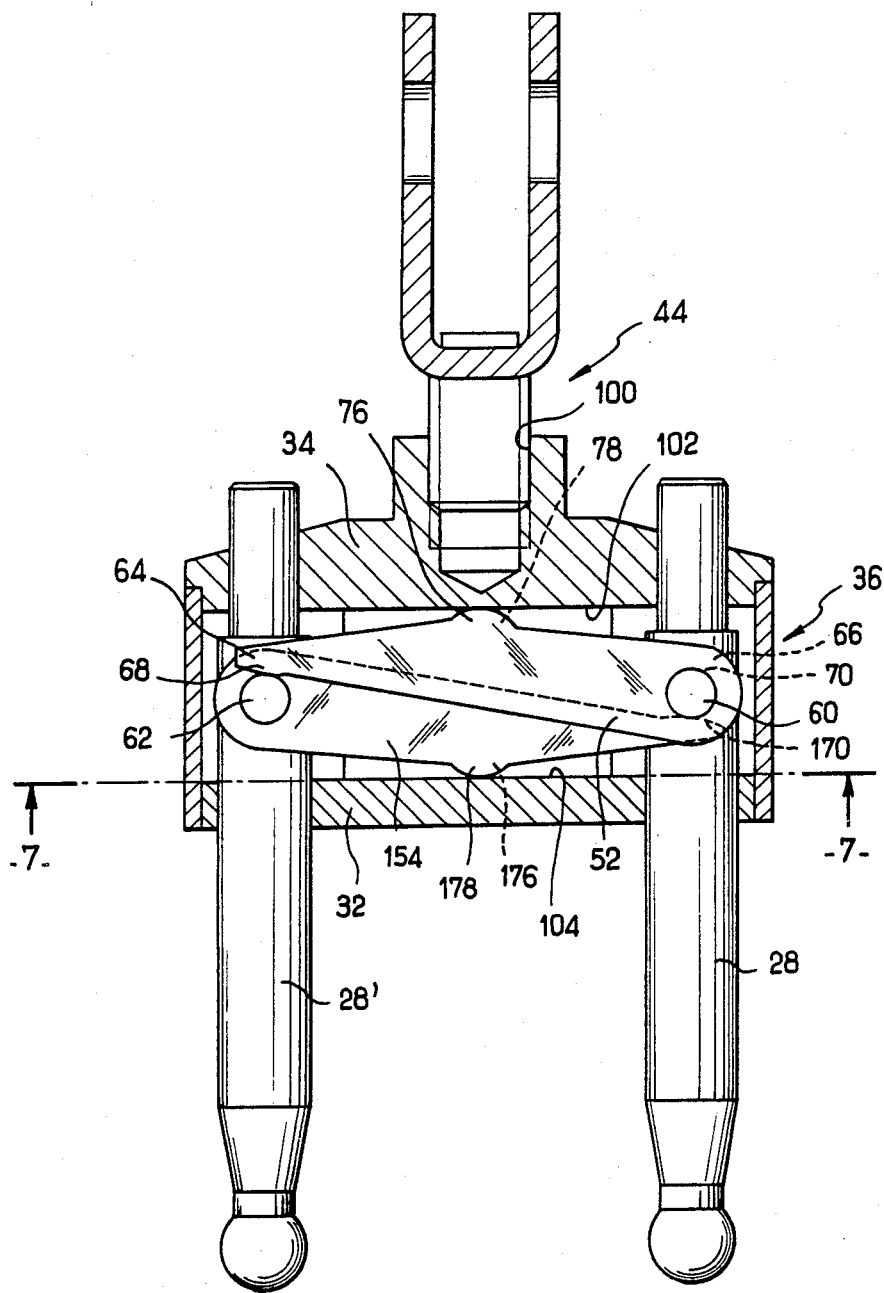
FIG. 6 is a sectional view of a third embodiment of control device.

FIG. 1 shows, in perspective, a control device for a twin master cylinder, which is shown as an assembly by reference 10, positioned between a brake pedal 12 which is adapted to be mounted so as to be hinged to a fixed portion of the vehicle (not shown) by means of a hole 14 which is capable of accepting a retaining shaft. Connection between the control device 10 and the pedal 12 is provided by a shaft which forms a pivot 16 passing through corresponding holes formed in the control device 10 and the pedal 12. At its other end the control device cooperates with a master cylinder, which is shown as an assembly by reference 18, and which may be mounted on a fixed portion of the vehicle (not shown) by means of a fixing flange 20 incorporating fixing holes 22. In a conventional manner the master cylinder 18 is supplied with brake fluid by means of a reservoir 24 and which is shown schematically in FIG. 1.

In a conventional manner the master cylinder 18 is of the twin type with two single master cylinders positioned parallel to one another and side by side, each of these master cylinders comprising at least one piston (not shown) which is capable of sliding in a corresponding bore formed in the body of the master cylinder. Each of the pistons, (not shown) has at its end facing the control device a cavity with a spherical bottom with which a spherical end 26 and 26' of each of the two pushrods 28 and 28' cooperates, as shown in FIG. 2 in which the master cylinder is not shown so that the figures may be more easily understood. The pushrods 28 and 28' are slideably mounted in holes 30 formed in the covers 32 and 34 of a body 36. The body 36, in addition to the covers 32 and 34, comprises a strut 38 formed by a tube whose cross-section is essentially rectangular and which defines with the covers 32 and 34 an enclosure 40. The covers 32 and 34 are held so as to bear against the strut 38 by means of a threaded connection 42 including a threaded portion which is firmly fixed to a control rod 44 having a shoulder 46 which cooperates with the cover 34. The control rod 44 terminates in a fork 48 incorporating two holes 50 which are positioned opposite one another and are intended to receive the shaft which forms a pivot 16 as shown in FIG. 1 so as to join the control rod 44 to the pedal 12.

In accordance with the invention, the control device 10 comprises two levers 52 and 54 which are each hinged at one end 56 and 58 to their respective pushrod 28 and 28', by means of shafts 60 and 62. The other end of each lever 64 and 66, respectively, comprises a cam surface 68 and 70, which is positioned facing a bearing surface which is fixed to the pushrods 28' and 28, and is formed by the outside surface of each of the shafts 62 and 60. Each of the levers 52 and 54 has a zone 72 and 74 in the shape of a cam of which a first convex portion 76–78 is pushed by a peg 80 which is fixed to the control rod 44. Each of the zones 72 and 74 includes a second portion 82 and 84 respectively, which is positioned between the first convex portion 76–78, and the other end of each of the levers. This second portion, 82 and 84, allows clearance for the peg 80, as is described below.

Referring to FIG. 3, in which the two pushrods 28 and 28' are shown axially offset as a result, for example, of the seizure of the piston corresponding to the rod 28' it is seen that the levers 52 and 54 are inclined relative to the general axis of the control device 10. In particular it will be seen that the lever 54, hinged to the rod 28' by means of the shaft 62, is pushed by the peg 80 through the first portion 78. It will also be seen that the first portion 76 of the lever 52 is positioned off-set relative to the peg 80, which is positioned facing the second portion 82 of the zone of the lever 52 and consequently the peg 80 is positioned facing the clearance portion which is recessed relative to the first portion and no longer pushes the lever 52. The lever 52 no longer being pushed by the peg 80 follows the movements which are imposed upon it by is shaft 60 and by its cam surface 68 which is capable of being in contact with the shaft 62 but without force owing to the second portion 82 of the zone 72. While the lever 54, which is hinged on its shaft 62 which is fixed to the pushrod 28', pushes, via the cam surface 70, the bearing surface formed on the pushrod 28 by means of the shaft 60, the pushing being essentially axial owing to the cooperating between the two cylindrical surfaces, namely the cam 70 and the shaft 60.

Referring to the FIG. 4, it will be seen that each of the shafts 60 and 62 passes through the corresponding pushrod 28 or 28' and projects on each side of the corresponding rod in such a way as to provide on the one hand the hinging of the lever on one side and to serve as a bearing surface for the other lever on the other side of the rod. In the same way, the peg 80 is formed by a shaft passing through the control rod 44 from one side to the other in such a way as to push the corresponding zone 72 and 74 on each of the levers 52, and 54. FIG. 4 shows that the strut 38 has an essentially rectangular section which allows the levers 52 and 54 to be effectively guided in the transverse plane. It can also be seen that the two levers 52 and 54 are positioned head to tail on each side of the three rods, the control and the pushrods 44, 28 and 28', respectively.

It will be understood from the foregoing description that if one piston seizes the system is able to fulfil the function of a bar while maintaining the distance between the centers of the two pushrods 28 and 28' by transferring to the pushrod corresponding to the piston, which is operating normally, the forces of the control rod 44 as is normal for conventional bars.

The embodiment described above, while capable of operating satisfactorily, may, in certain circumstances, have undesirable play between the push rods 28 and 28' and the body 36. The embodiment shown in FIG. 5 includes means to minimize this play.

The control device shown in FIG. 5 is simplified with respect to the embodiment of FIGS. 1 to 4 in that the control rod 44 is mounted directly in a threaded opening 100 in the cover 34 of the body 36. The cam shaped zones 76 and 78 of levers 52 and 54 directly abut an interior surface 102 of the cover 34. The free ends 64 and 66 of each lever 52 and 54 each comprise a cam surface 68 and 70 which are urged into contact with a respective external surface of the shafts 62 and 60 which are fixedly mounted on their respective push rods 28 and 28'.

In order to reduce the play between the push rods 28 and 28' and the body 36, the control device further comprises one, or preferably two spring means, for example leaf springs 104 which are generally V-shaped and are located within the body 36. Each leaf spring 104 is arranged so that its apex 106 abuts an internal surface 108 of the body 36 opposite surface 102 and the end of each of its arms 110 and 112 are urged against a respective shaft 60, 62, or, as shown in the figure, against an adjacent portion of the corresponding lever. The leaf spring 104 urge the two push rods 28 and 28' towards the interior surface 102 of the body 36 thus minimizing the play between the push rods and the body 36.

Figure 7:
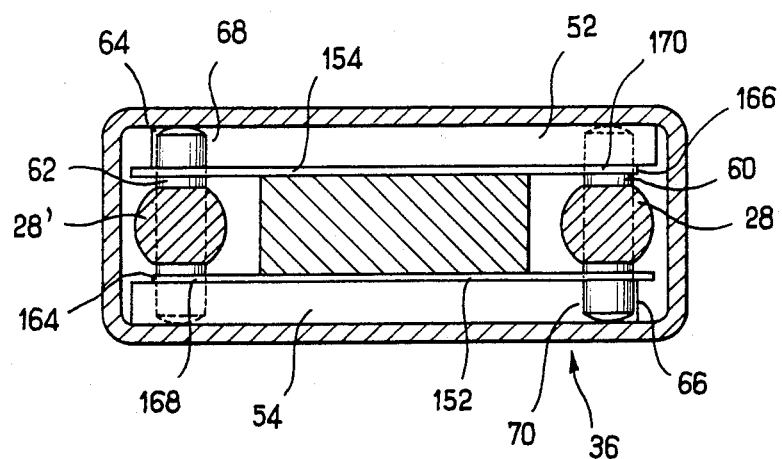
FIG. 7 is a view taken along line 7—7 of FIG. 6.

The control device shown in FIGS. 6 and 7 is a further embodiment which is also intended to minimize any play between the push rods 28 and 28' and the body 36 but differs from the embodiment shown in FIG. 5 in that no springs are used. The control device is also intended to withstand forces in traction on the control rod 44 as well as in compression.

As in the embodiment of FIG. 5 the control rod 44 is mounted directly in the cover 34 of the body 36. In order that the device may safely withstand tensile forces on the control rod 44, such as may occur if the vehicle brake pedal is accidentally pulled, the control device comprises four levers 52, 54 and 152, 154. As in the embodiment of FIG. 5 the cam shaped zones 76 and 78 of the upper levers 52, 54 directly abut the interior surface 102 while their free ends 64, 66 each comprise a cam surface 68 and 70 urged into contact with respective shafts 62 and 60. Similarly, the lower levers 152, 154 each comprise a respective cam shaped zone 176, 178 which directly abut a lower interior surface 104 of the base 32 of the body 36. The free ends 164 and 166 of levers 152 and 154 each comprise a respective cam surface 168 and 170 which abut a respective lower surface of the shafts 62 and 60. This arrangement of four opposing levers both minimizes the play between the components and enables the control device to withstand tensile forces as well as compressive forces. As the compressive forces undergonee by the control device are generally greater than the possible tensile forces, levers 152 and 154 are thinner than levers 52 and 54 as shown in FIG. 7.

It will be seen that due to the invention, a control device is obtained which is of simple construction and is thus reliable, whose cost price is reduced and which fully resolves the problem raised by a control utilizing a bar which must be rigid between a pedal and a master cylinder in that no guidance is necessary between these two components.

It will also be understood that in the case in which the two master cylinders are operating correctly the assembly of the control device moves under the effect of the actuating pedal and remains in the position shown in FIG. 2. It will also be understood that for any partial imbalance between the two pistons the system operates in the manner described in relation to FIG. 3 except that the levers 52 and 54 assume a smaller inclination relative to the general axis of the control device.

We claim:

1. A control device for a twin master cylinder of the type comprising two master cylinders positioned parallel to one another and side by side, the device positioned between an actuating pedal and pistons of the master cylinders, the device comprising a control rod connected to the pedal and two push rods each of which are capable of acting upon one of the pistons, the push rods guided so as to slide parallel to axes of the master cylinders, characterized in that the control rod cooperates with the push rods through levers each of which is hinged at one end to one of the push rods and is pushed so as to bear at the other end against a bearing surface of the other push rod, the levers positioned head-to-tail on each of the push rods, the levers pushed by abutment means aligned and operatively connected with the control rod, each of the levers pushed at a zone situated essentially at the middle of the respective lever, each lever hinged at the one end by means of a shaft of the associated push rod, each shaft located away from ends of the respective push rod, the bearing surfaces comprising the shafts, and the control device comprising a casing fixed firmly to the control rod and including aligned holes disposed at opposite ends of the casing for slidably guiding each of the push rods, each rod extending exteriorly of the casing and each of the holes, the casing guiding laterally the levers.

2. The control device according to claim 1, characterized in that the device further includes spring means comprising a leaf spring arranged inside the body and acting on the push rods.

3. The control device according to claim 2, characterized in that the leaf spring is generally V-shaped and has spring arms, an end of each spring arm being urged toward a respective bearing surface.

4. The control device according to claim 9, characterized in that the device comprises four levers arranged in a body of the device, two of the levers each being mounted pivotably at one end on one of the push rods and a free end of each lever urged against the bearing surface of the other push rod, each lever comprising a cam surface arranged to abut a surface of the body.

5. The control device according to claim 9, characterized in that the abutment means comprises a peg located on the control rod.

6. The control device according to claim 9, characterized in that the abutment means comprises at least one bearing surface on a housing disposed about the push rods and levers.

7. The control device according to claim 1, characterized in that each lever includes a cam surface on the other end which is positioned facing the bearing surface of the respective shaft and which pushes the associated push rod essentially axially.

8. The control device according to claim 7, characterized in that the zone forms a cam surface of which a first portion is pushed essentially axially by the abutment means.

9. A control device for a twin master cylinder of the type comprising two master cylinders positioned parallel to one another and side by side, the device positioned between an actuating pedal and pistons of the master cylinders, the device comprising a control rod connected to the pedal and two push rods each of which are capable of acting upon one of the pistons, the push rods guided so as to slide parallel to axes of the master cylinders, characterized in that the control rod cooperates with the push rods through levers each of which is hinged at one end to one of the push rods and is pushed so as to bear at the other end against a bearing surface of the other push rod, the levers positioned head-to-tail on each of the push rods, the levers pushed by means of an abutment aligned and operatively connected with the control rod, each of the levers pushed at a zone situated essentially at the middle of the respective lever, each lever hinged at the one end by means of a shaft of the associated push rod, each shaft located away from ends of the respective push rod, the bearing surfaces comprising the shafts, each lever including a cam surface on the other end which is positioned facing the bearing surface of the respective shaft and which pushes the associated push rod essentially axially, the zone forming a cam surface of which a first portion is pushed essentially axially by the abutment, and the cam surface of the zone comprising a recessed second portion which prevents pushing by the abutment when the abutment is positioned between the first portion and the other end.

10. A control device for a twin master cylinder of the type comprising two master cylinders positioned parallel to one another and side by side, the device positioned between an actuating pedal and pistons of the master cylinders, the device comprising a control rod connected to the pedal and two push rods each of which are capable of acting upon one of the pistons, the push rods guided so as to slide parallel to axes of the master cylinders, characterized in that the control rod cooperates with the push rods through levers each of which is hinged at one end to one of the push rods and is pushed so as to bear at the other end against a bearing surface of the other push rod, the levers positioned head-to-tail on each of the push rods, the levers pushed by abutment means aligned and operatively connected with the control rod, each of the levers pushed at a zone situated essentially at the middle of the respective lever, each lever hinged at the one end by means of a shaft of the associated push rod, each shaft located away from ends of the respective push rod, the bearing surfaces comprising the shafts, the device further comprising spring means in abutment with a body of the device and adapted to urge each of the push rods so as to reduce play between the push rods and the body, the levers pivoting directly on the abutment means which comprises an inner surface of the body.

* * * * *